United States Patent [19]

Yoon

[11] Patent Number: 5,504,823

[45] Date of Patent: Apr. 2, 1996

[54] IMAGE DATA PARTITIONING CIRCUIT FOR PARALLEL IMAGE DECODING SYSTEM

[75] Inventor: Sang-Ho Yoon, Seoul, Rep. of Korea

[73] Assignee: Daewoo Electronics Co. Ltd., Seoul, Rep. of Korea

[21] Appl. No.: 127,588

[22] Filed: Sep. 23, 1993

[30] Foreign Application Priority Data

Sep. 23, 1992 [KR] Rep. of Korea ............... 92 17347

[51] Int. Cl.[6] ................................................ G06K 9/36
[52] U.S. Cl. ..................... 382/233; 382/304; 348/419; 348/399
[58] Field of Search ................... 382/41, 56, 233, 382/304, 305; 348/419, 399

[56] References Cited

U.S. PATENT DOCUMENTS

| | | | |
|---|---|---|---|
| 4,734,767 | 3/1988 | Kaneko et al. | 348/400 |
| 4,897,719 | 1/1990 | Griffin | 348/409 |
| 4,985,766 | 1/1991 | Morrison et al. | 348/419 |
| 5,311,307 | 5/1994 | Yoshimoto | 348/384 |

Primary Examiner—Leo Boudreau
Assistant Examiner—Chris Kelley
Attorney, Agent, or Firm—William F. Pinsak

[57] ABSTRACT

There is provided an image data partitioning circuit for use in a parallel image decoding system which is capable of a effective partitioning operation for a variable length coded image, thereby advantageously achieving a high speed decoding operation. The image data partitioning circuit comprises: N buffer, each coupled to the respective decoding module for storing a partitioned variable length coded image to be processes thereby, respectively; first detector for detecting a starting position of the horizontally sliced data and generating a starting position detection signal; second detector for detecting a vertical position of the horizontally sliced data and for generating a vertical position detection signal; and partitioning device responsive to the starting position detection signal and the vertical position signal for partitioning the variable length coded image and for sequentially coupled the partitioned data of the variable length coded image to the N buffers.

1 Claim, 4 Drawing Sheets

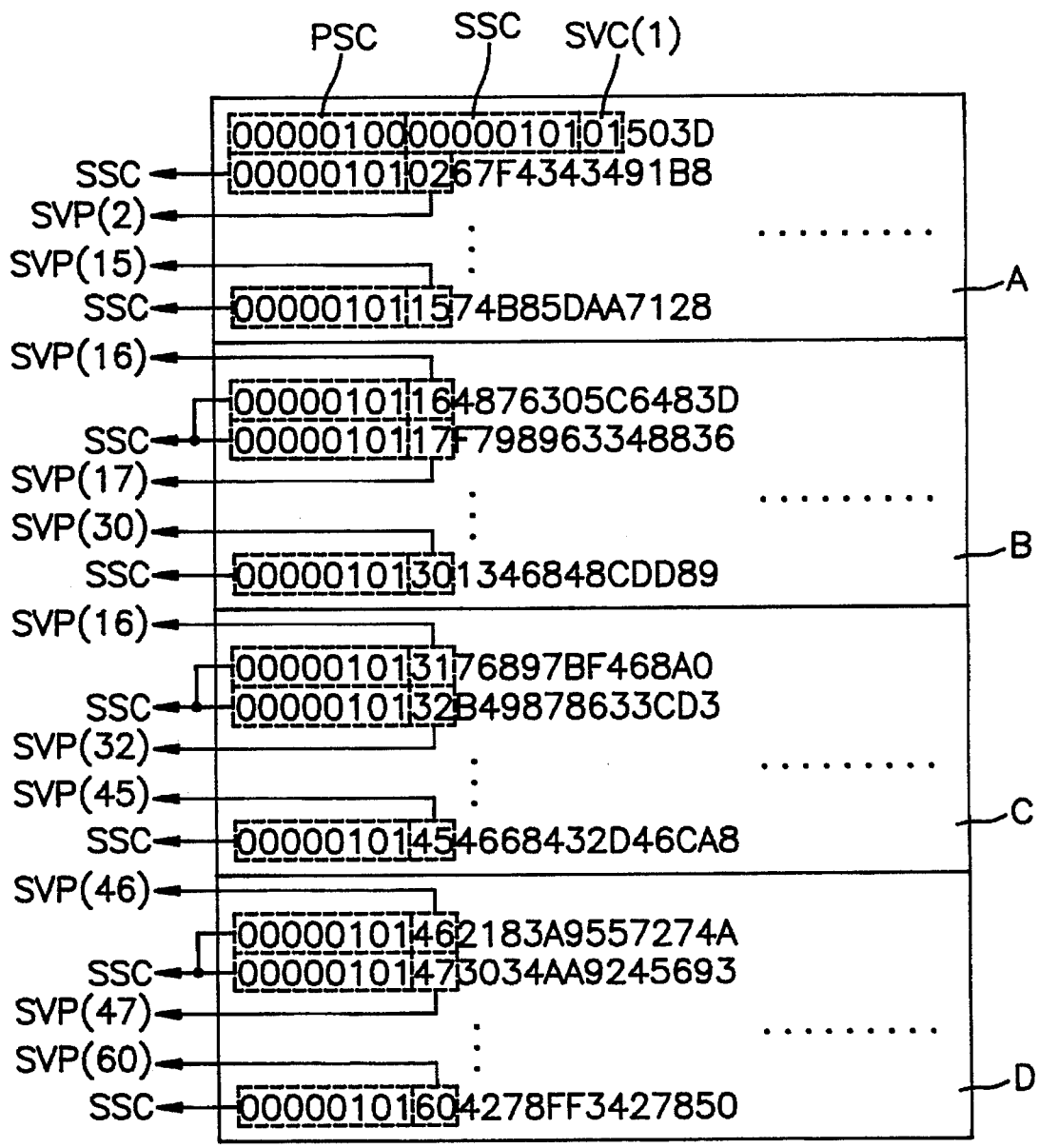

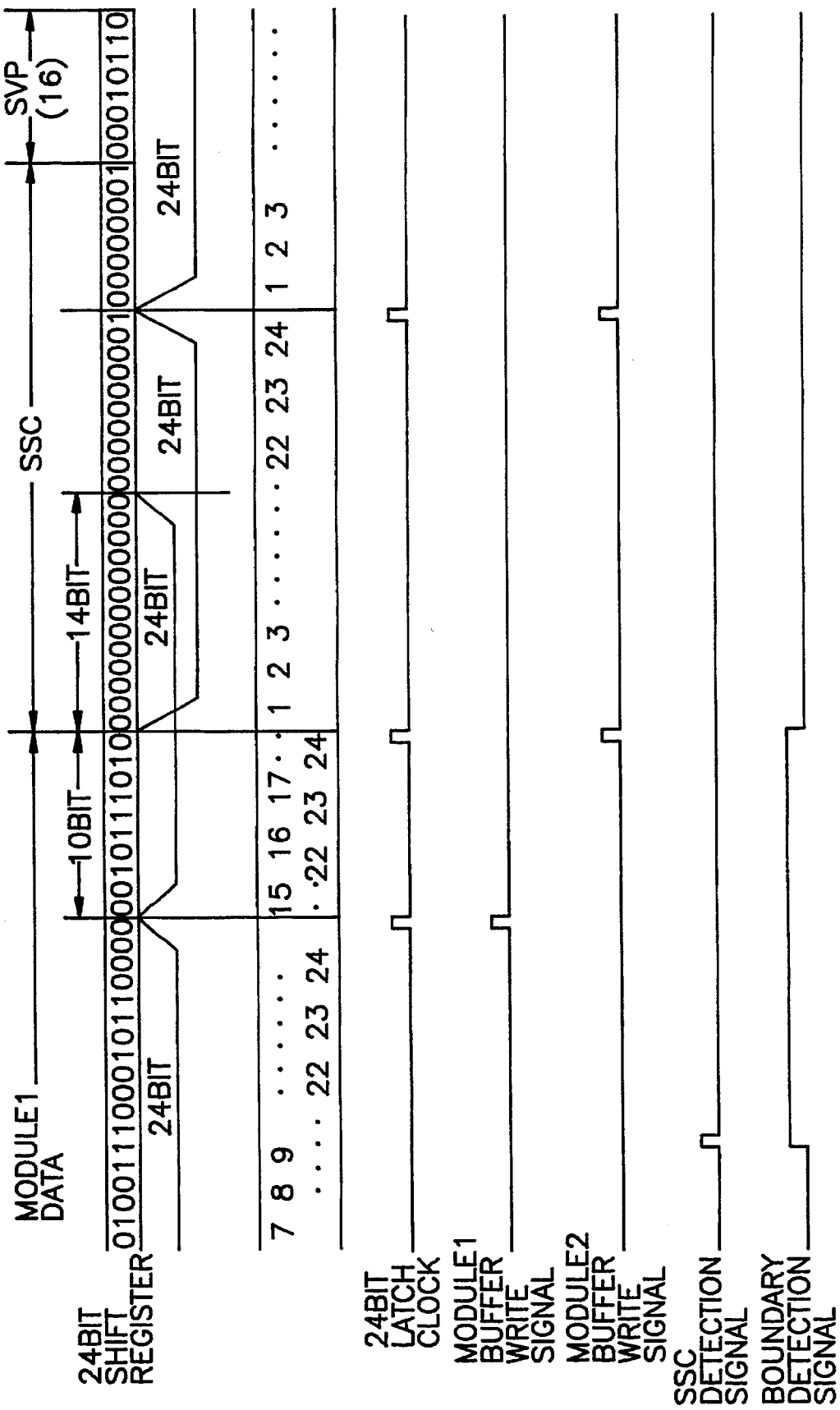

IMAGE DATA PARTITIONING CIRCUIT FOR PARALLEL IMAGE DECODING SYSTEM

FIELD OF THE INVENTION

The present invention relates to an image decoding system; and, more particularly, to an image data partitioning circuit for use in an image decoding system having N decoding modules for decompressing incoming compressed image data in parallel, which is capable of providing a real time decoding operation by effectively extracting a decoding objective bit stream.

DESCRIPTION OF THE PRIOR ART

In digital image processing system such as videotelephone, teleconference and high definition television ("HDTV") systems, a large amount of digital data is required to define each video frame which comprises a sequence of digital data referred to as pixels. However, the available frequency bandwidth of a conventional transmission channel to transmit the data is limited. Therefore, it has become necessary to reduce the substantial amount of data by way of employing various data compression techniques, which comprise a transform coding using a Discrete Cosine Trans form ("DCT") process that reduces the spatial correlation, motion compensation coding for reducing the temporal correlation between two successive frames and a variable length coding using Huffman coding for entropy encoding the data. The encoded digital image is then transmitted via a channel to the decoding system. The decoding process reverses the above steps.

Because encoded digital image is still large in amount of the data, the decoding system performing the decoding process must have a fairly high bandwidth and be able to handle all necessary matrix-matrix multiply operation required by the decoding process in a short period of time. To date, no single device processes the necessary computing power to decompress an incoming compressed bit stream at the necessary rate to make data available for high definition television system.

For processing video data in real time, a parallel decoding system is disclosed in U.S. Pat. No. 5,212,742 issued on May 18, 1993, which comprises N computing units for processing an image, thereby increasing performance of the system as a whole. However, there is no description of the partitioning circuit for variable length coded image.

SUMMARY OF THE INVENTION

It is, therefore, a primary object of the invention to provide an image data partitioning circuit for use in a parallel image decoding system which is capable of a effective partitioning operation for a variable length coded image, thereby advantageously achieving a high speed decoding operation.

In accordance with the present invention, there is provided an image data partitioning circuit for use in an image decoding system. The image decoding system have N decoding modules for decompressing an variable length coded image in parallel, wherein the variable length coded image includes a plurality of horizontally sliced data thereof and N is a integer more than 1. The image data partitioning circuit comprises: N buffer, each coupled to the respective decoding module for storing a partitioned variable length coded image to be processes thereby, respectively; first detector for detecting a starting position of the horizontally sliced data and generating a starting position detection signal; second detector for detecting a vertical position of the horizontally sliced data and for generating a vertical position detection signal; and partitioning means responsive to the starting position detection signal and the vertical position signal for partitioning the variable length coded image and for sequentially coupled the partitioned data of the variable length coded image to the N buffers

BRIEF DESCRIPTION OF THE DRAWINGS

The above and other objects and features of the instant invention will become apparent from the following description of the preferred embodiments taken in conjunction with the accompanying drawings, in which:

FIG. 3 is an explanatory diagram for depicting the partitioning of an image for decompressing by each of the decoder shown in FIG. 1; and FIG. 4 is a time chart for showing the partitioning operation of the image data partitioning circuit in accordance with the present invention.

DETAILED DESCRIPTION OF THE PREFERRED EMBODIMENTS

Figure 1:
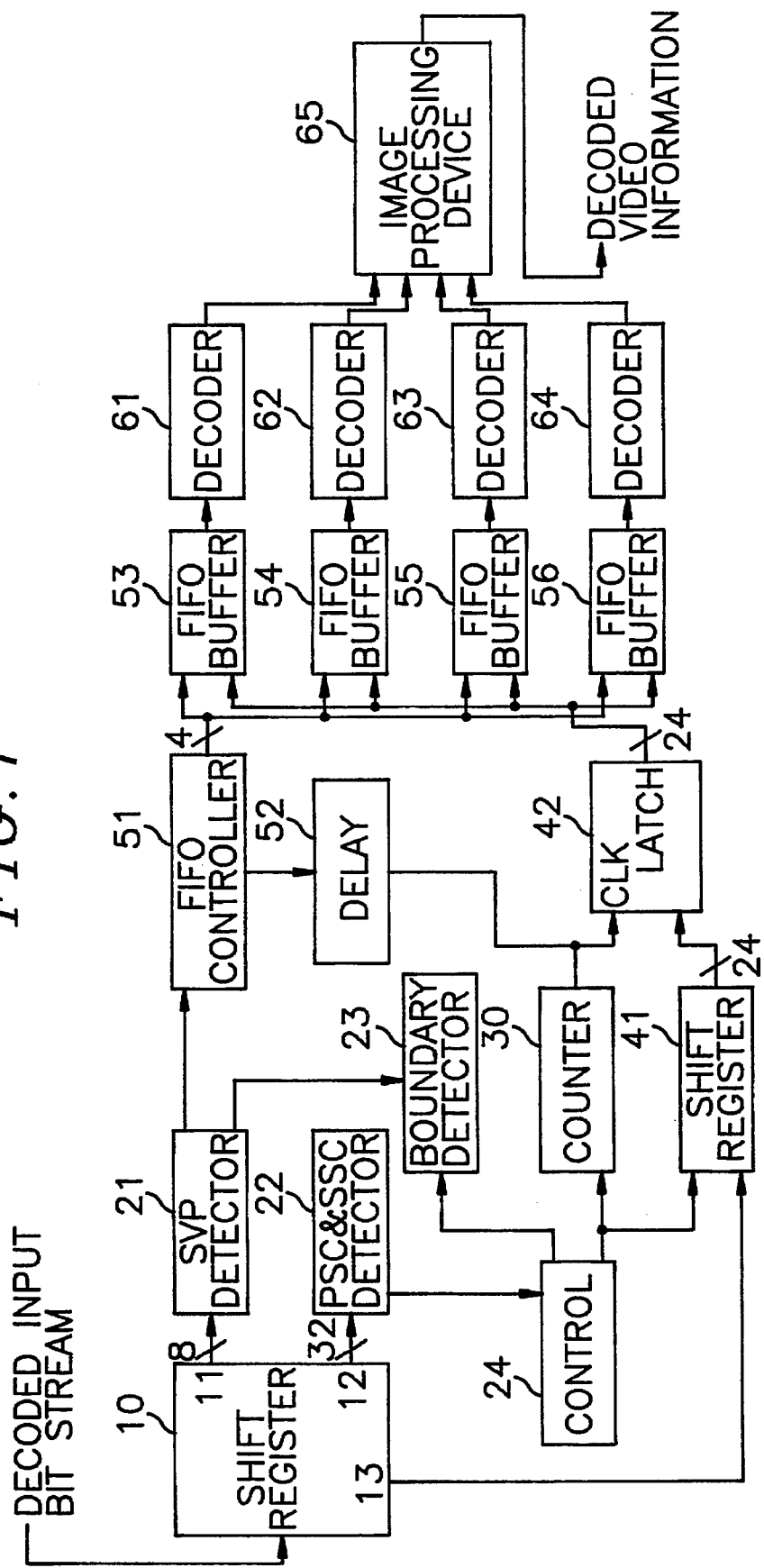
FIG. 1 shows a schematic diagram of a parallel image decoding system employing an image data partitioning circuit in accordance with the present invention.

Referring to FIG. 1, there is shown a block diagram of a parallel image decoding system, which comprises an image data partitioning circuit of a preferred embodiment of the present invention.

The parallel image decoding system comprises 4 decoder modules 51, 62, 53, and 64 coupled in parallel to the image data partitioning circuit. Each of the decoder modules 61, 62, 63, or 64 independently decompresses compressed input data and, in a preferred embodiment, includes variable length decoding block, inverse quantizer block and inverse DCT (Discrete Cosine Transform) block. As is known in the art, the main function of the-variable length-block and the inverse quantizer block is to reconstruct the DCT coefficients from their Huffman encoded values, rescale these values and pass these on to inverse DCT block. The inverse DCT block takes coefficients and reconstitute the underlaying spatial video information. The spatial video information reconstituted by respective decoder modules 61, 62, 63 and 64 is simultaneously coupled to a image processing device 65 which serves to perform a motion compensation and couple decoded video information to a display device. As is known in the art, the motion compensation determines the best block to be used for reconstruction from the last frame. Although only four parallel decoder modules 61, 62, 63, and 64 are set forth in the preferred embodiment, more or less than four parallel decoder units may be used along with the corresponding increase or decrease in decoding speed associated with the addition or the less of each decoder unit.

The image data partitioning circuit includes 4 FIFO buffers 53, 54, 55, and 56. Each of the FIFO buffers 53, 54, 55 and 56 is coupled to respective decoder 61, 62, 63, and 64, and serves to temporally store compressed data for processing thereby in the first-in-first-out order. The image partitioning circuit also includes a shift register 10 which receives a decoded input bit stream and perform a bit shifting operation though the use of the system clock. The shift register 10 includes 2 ports 11 and 12. 8-bit parallel data is sequentially coupled through the port 11 to a SVP detector 21 which detects a slice vertical head and generates a slice vertical position direction signal. 32-bit parallel data is sequentially coupled through the port 12 to a PSC & SSC detector 22 which detects a frame start head and slice start head and generates a frame start position detection signal and a slice start position detection signal. The shifter register 10 also include a port 13 which serves to provide sequentially the encoded input bit stream through the system clock for synchronization to a shift register 41.

The slice vertical position detection signal is simultaneously coupled to a boundary detector 23 and a FIFO controller 51. The boundary detector 23 serves to detect a boundary position between bit streams to be stored stored each FIFO buffer 53, 54, 55, and 56. The boundary detector 23 has a memory which stores an overlapped bit length data denoting a number of bits commonly stored in consecutive two buffers, e.g., initial 14 bits of SSC code stored in the consecutive two buffer 53 and 54 simultaneously as shown in FIG. 4. The overlapped bit length data is loaded to counter 30. The control block 24 serves to control the counter 30 and the second shift register 41. A count from the counter 30 is used for clock to control a latch circuit 42 and coupled through the FIFO controller 51.

Figure 2:
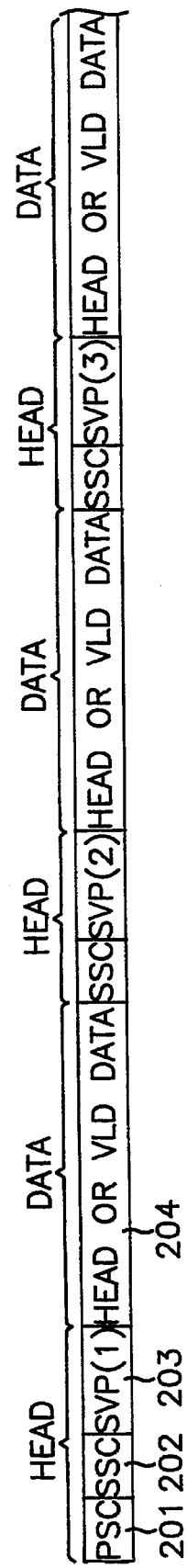
FIG. 2 provides an illustrative diagram for showing a portion of an image data in the form of bit stream.

Referring to FIG. 2, a more detailed representation of a compressed input bit stream used in the preferred embodiment is shown. The compressed input bit stream contains 3 head fields 201, 202, and 203 which provide information about the data 204 contained within the frame. The first head field 201 is 32 bits in length and known as "Frame Start Code" (PSC: picture start code, i.e.,"00000100H"). The second head field 202 is 32 bits in length and known as "Slice Start Code (SSC)" i. e., "00000101H". The third head field 203 is 8 bits in length and known as "Slice Vertical Position (SVP)". The remaining field 204 is a variable length data field. This contains appropriate variable length coding data for the frame.

As may be seen from the above, it should be appreciated that the compressed input bit stream contains a plurality of the frames i. e., images and one frame has a plurality of the slices containing the variable length coding data.

Referring now to FIG. 3, in order for the decoder modules 61, 62, 63, and 64 to decode the compressed input image data, the image data must be split into component parts to allow each decoder module to independently process the data. Therefore, the preferred embodiment uses a scheme such that set forth in FIG. 3. As is shown, an image i. e., a frame which is displayed at a time is divided into a number of horizontal "stripes" A, B, C, and D, each of which is assigned to a separate parallel decoding node such as 61, 62, 6B, and 64, and contains a number of slices. This is, the decoder module 61 will be assigned the stripe A for processing. The decoder module 62 receives the stripe B, the decoder module 69 receives the stripe C and the decoder module 64 receives the stripe D. this is achieved by the image data partitioning circuit. Using this partitioning scheme, each decoder module performs variable length decoding, inverse quantizing, and inverse DCT independently of the other decoder module. The stripe and the slice width are the full screen of frame and the stripe length is determined by the number of parallel decoder module. The slice length is predetermined by the coding scheme. Although the stripe width is the full screen of frame, the data contained in the slice is variable length code and has various bit length. Therefore, as the FIFO buffers 53, 54, 55, and 56 have fixed bit storing positions, respectively , it is difficult to partition the frame into the stripes A, B, C, and D to be processed by the decoder modules 61, 62, 63, and 64.

Referring now to FIG. 4, there is a time chart illustrating the partitioning operation of the image data partitioning circuit shown in FIG. 1. The compressed input bit stream from a channel decoder(not shown) is coupled through the shift register 10 to the SVP detector 21, the PSC & SSC detector 22 and the second shift register 41. The PSC & SSC detector 22 receives 32 bit parallel data from the shift register 10 and couples the PSC detection signal or the SSC detection signal to the control block 24 when PSC or SSC head i. e., 00000100H or 00000101H is detected. The SVP detector receives 8 bit parallel data and couples the SVP detection signal to the FIFO controller 51 and the boundary detector 23, simultaneously when the SVP head is detected. The boundary detector 23 also receives the SSC detection signal through the control block 24 and determines a boundary position between the decoder module data i.e., the stripes by counting the SVP detection signal and then responding to the SSC detection signal.

The second shift register 41 receives the compressed input bit stream in serial and converts it to 24 bit parallel data by the bit shifting operation. The 24 bit parallel data is then coupled to the latch circuit 42. During the bit shifting operation, the counter 30 counts the number of the shifting operation and generates a latch clock signal when the count reaches to 24. The latch clock signal is then coupled to the latch circuit 42 and through the delay 52 to the FIFO buffer controller 51. The latch circuit 42 output the 24 parallel data in response to the latch clock signal. Then, the FIFO controller 51 selects the desired FIFO buffer in response to the SVP detection signal and couples a buffer write signal to a selected FIFO buffer. The 24 bit parallel data is then stored in the selected FIFO buffer.

At boundary between the buffer 53 (module 1) and the buffer 54, The first SSC detection signal of the next stripe is coupled through the control block 24 to the boundary detector 23. The boundary detector 23 generates the boundary detection signal to the counter 30 and monitors remaining bits (10 bits) of the current stripe. Then, as shown in FIG. 4, the boundary detector 23 loads a count of 24 into the counter 30 and the count of the counter 30 starts from 15. When count of the counter 30 reaches to 24, the counter 30 generates the latch clock signal. In response to the latch clock signal, the FIFO controller 51 generates the buffer write signal for the FIFO buffer 54. Therefore, 10 bits of the current stripe A and 14 bits of the next stripe B is stored in the FIFO buffer 53 and the storing operation of the FIFO buffer 54 starts from the most significant bit of the stripe B. This operation is repeated until the FIFO buffer 56 is filled.

At the next frame, the PSC head is ignored by a counter disable signal from the control block 24 and 14 bits of the SSC head is rejected by a boundary detection signal from the boundary detector 23. Therefore, 14 bits overlapped in the previous frame is now available.

As may be seen from the above, it is readily appreciated that the image data partitioning circuit in accordance with a preferred embodiment of the present invention is capable of providing the effective partitioning scheme for the variable length coded frame data.

While the present invention has been shown and described in connection with the preferred embodiments thereof, it will be readily apparent to those of ordinary skilled in the art that many changes and modifications may be made without departing from the spirit and scope of the invention as defined in the appended claims.

What is claimed is:

1. An image data partitioning circuit for use in an image decoding system having N decoding modules for decompressing a variable length coded image in parallel, wherein the variable length coded image includes M number of horizontally sliced data thereof, each of the sliced data having a different bit length, and N and M being integers larger than 1, which comprises:

N buffer means for storing the variable length coded image, wherein each of the buffer means is coupled to its corresponding decoding module and has fixed storage locations for storing M/N number of the horizontally sliced data;

first detecting means for detecting a starting position of the horizontally sliced data and generating a starting position detection signal; and partitioning means, responsive to the starting position detection signal, for sequentially providing the horizontally sliced data to a preceding buffer means and for detecting ((M/N)i+1)st horizontally sliced data to provide the horizontally sliced data to a next buffer means, thereby sequentially providing M/N horizontally slice data to the N buffer means, wherein i is 0 or an integer from 1 to N, said partitioning means including:

storage means for temporarily storing the horizontally sliced data and, in response to a clock signal, for simultaneously providing a predetermined number of bits contained in the horizontally sliced data to the buffer means;

counting means for counting a bits contained in the horizontally sliced data to generate the clock signal when said counted value reaches the predetermined number;

boundary detection means for sensing the start position detection signal to generate a boundary detection signal when the ((M/N)i+1)st horizontally sliced data is detected and for detecting initial bits of the ((M/N)i+1)st horizontally sliced data contained in the predetermined number of bits to add a value representative of the number of the initial bits to the counted value; and means, in response to the clock signal, for providing a buffer write signal to the buffer means and, in response to the boundary detection signal and the clock signal, for providing the buffer write signal to the next buffer means.

\* \* \* \* \*